United States Patent [19]
Mochida

[11] Patent Number: 5,549,724
[45] Date of Patent: Aug. 27, 1996

[54] FILTER ELEMENT OF AIR CLEANER UNIT

[75] Inventor: Kazuomi Mochida, Tokyo, Japan

[73] Assignee: Going Tokyo Co., Ltd., Tokyo, Japan

[21] Appl. No.: 351,160

[22] Filed: Nov. 30, 1994

[30] Foreign Application Priority Data

Oct. 24, 1994 [JP] Japan .................................. 6-014171 U
Oct. 24, 1994 [JP] Japan .................................... 6-282429

[51] Int. Cl.[6] .................................................. B01D 39/08
[52] U.S. Cl. .................................. 55/521; 55/336; 55/510
[58] Field of Search .............................. 55/276, 521, 510, 55/336

[56] References Cited

U.S. PATENT DOCUMENTS

| | | | |
|---|---|---|---|
| 731,898 | 6/1903 | Hawkins | 55/336 X |
| 3,209,520 | 10/1965 | McKinlay | 55/276 |
| 3,347,028 | 10/1967 | Erbstoesser | 55/510 |
| 3,385,039 | 5/1968 | Burke et al. | 55/521 X |
| 3,458,050 | 7/1969 | Cooper | 55/510 X |
| 3,811,251 | 5/1974 | Gibel | 55/276 |
| 4,130,405 | 12/1978 | Akado et al. | 55/510 X |
| 4,243,397 | 1/1981 | Tokar et al. | 55/521 X |
| 5,106,397 | 4/1992 | Jaroszczyk et al. | 55/521 X |

Primary Examiner—Robert Warden
Assistant Examiner—Krisanne M. Thornton
Attorney, Agent, or Firm—Rogers & Killeen

[57] ABSTRACT

An air filter having a tapered cylindrical filter member is attached to an engine air intake at its larger end and has an inverted frusto-conical member inside the opposing smaller end for reducing turbulent air flow through the air filter. The inverted frusto-conical member includes an air filter portion which may be the tapered walls of the inverted frusto-conical member, or the smaller flat end of the inverted frusto-conical member. A funnel inside the larger end of the tapered cylindrical filter member further reduces turbulence of the air flow from the air filter into the engine air intake.

13 Claims, 5 Drawing Sheets

FILTER ELEMENT OF AIR CLEANER UNIT

BACKGROUND OF THE INVENTION

1. Field of the Invention

The present invention relates to a filter element of an element exposure type air cleaner built in an automobile engine or the like.

2. Description of the Related Art

Hitherto, the most generally used type of air cleaner provided in the intake system of an automobile engine has been the cover type in which the filter element is accommodated in an air cleaner case connected to an air intake duct. However, there is known the element exposure type of air cleaner in which the filter element, itself, is directly connected to the air intake duct, as optional parts or as the so-called replacement parts.

The filter element of the element exposure type has its filter element exposed to the outside, so that it has better air intake efficiency than the cover type air cleaner. This is effective in increasing the engine output, so that it is often used in, for example, sports cars as a replacement of the installed air cleaner. However, with the limited space in the engine room, it is necessary to take special care to manufacture the filter element into a proper shape.

Figure 5:
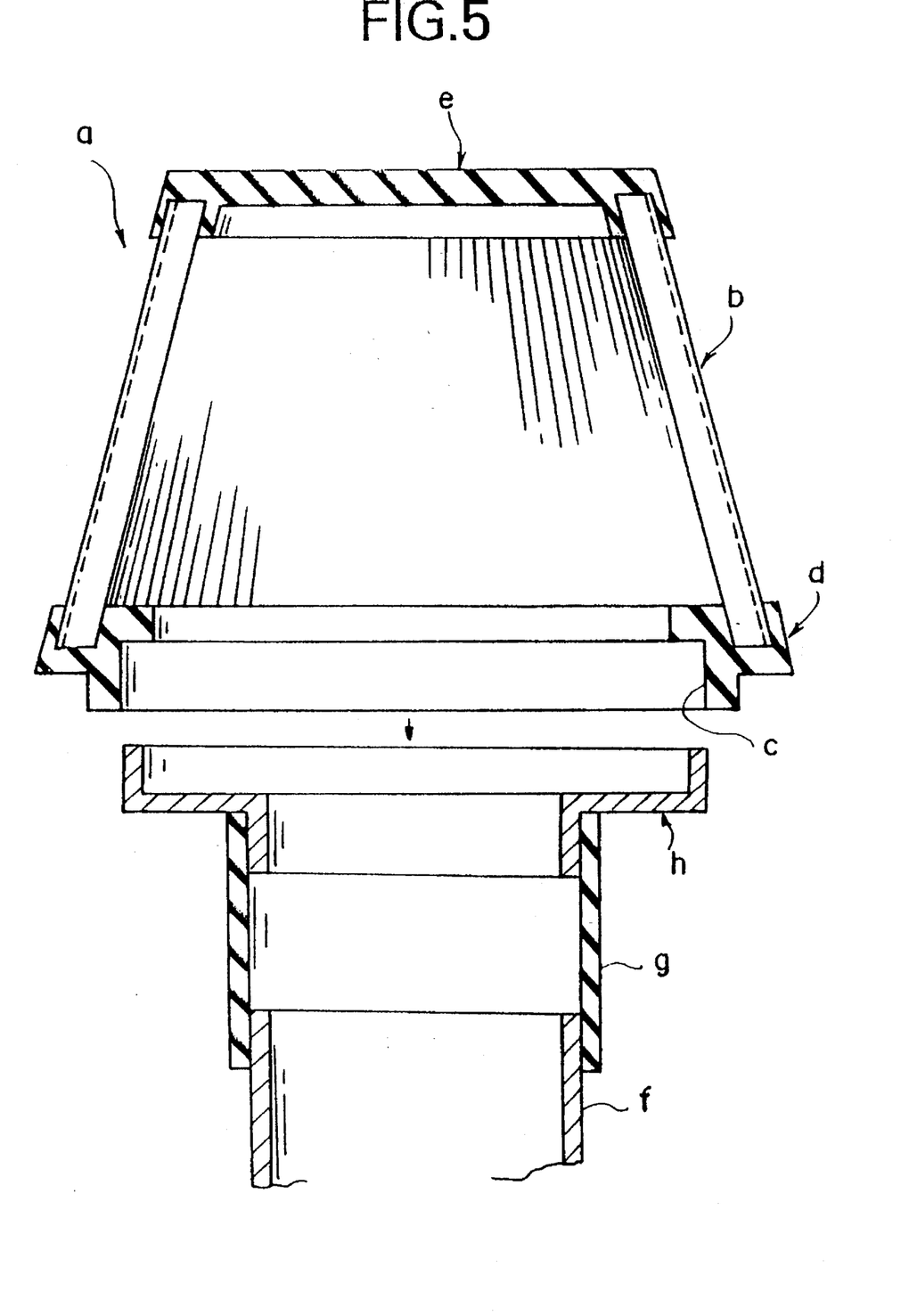
FIG. 5 is a vertical cross section of a filter element in a conventional air cleaner unit.

FIG. 5 is a cross sectional view of one example of the aforementioned conventional element exposure type air cleaner unit. Filter element b is made of such a suitable filter material as paper, cloth, unwoven cloth, which is shaped into a tapered cylinder in which the filter wall face is pleated. A ring-shaped connecting member, d, which is made of synthetic resin and has an air intake duct connecting port c, is integrally connected to the larger diameter end portion side of the element b, while blind cover member e made of synthetic rubber is integrally connected to the smaller end portion side thereof. These members are adhered to their respective end portions by vulcanization. This air cleaner unit a is installed to the engine in the following way. The aforementioned air intake duct connection port is fitted and fixed to joint fixture h, which is connected by means of the connection duct g, and this duct g is connected to engine intake pipe f.

Only the outer peripheral portion of the blind cover member e of the aforementioned air cleaner unit a is formed into the shape of a ring from synthetic resin, while the inner periphery is formed by fixing such a cover member as a metal plate, or a synthetic resin plate.

In the conventional unit illustrated in FIG. 5, the air intake face of the filter element b is a tapered cylinder of a pleated filter material. This means that it occupies a small volume, so that a large air intake area can be achieved even if its external shape is made relatively compact. Therefore, this unit is designed so that a large amount of air can be taken in efficiently by forming the filter element into a shape occupying a small area.

However, in the filter element b of the air cleaner unit a of the conventional type, when air is sucked in from the filter wall face of the tapered cylinder, a turbulence occurs almost directly below the blind cover member e, which results in the production of a larger air intake noise. Accordingly, it has been pointed out that there is considerable loss air suction amount.

SUMMARY OF THE INVENTION

In view of the above-described problem, the present invention is aimed at providing a filter element for the exposure type air cleaner unit which is capable of preventing turbulence from occurring during air suction to reduce air suction noise and to control loss in suction amount.

To this ends, according to a first embodiment of the present invention, there is provided a filter element in which a pleated filter material is made into a tapered cylinder and whose larger diameter side opening is connected to the engine intake duct, the filter element comprising a cone member provided vertically within the smaller diameter side opening of the filter element, with its base section covering the opening, and wherein its head portion extending from the central portion to the front end is cut to form an opening which is covered with filter material, with the inner peripheral wall formed into the shape of a funnel.

According to the first embodiment, there is provided a filter element wherein the inner side of the larger diameter side opening of the tapered cylindrical filter element is formed into an air funnel.

According to a second embodiment of the present invention, there is provided a filter element in which a pleated filter material is formed into a tapered cylinder and whose large diameter side opening is connected to the engine intake duct, wherein the smaller diameter side opening of the filter element is funnel-shaped, and wherein a sub-filter element is provided within the filter element, the sub-filter element having its base connected to the outlet of the funnel-shaped section, and formed into a cylinder from filter material which tapers from the front end side to the larger diameter side opening, with the front end covered.

According to the second embodiment, there is provided a filter element of the second aspect, wherein a deep air funnel section is formed at the smaller-diameter side opening, and a sub-filter element of a small diameter tapered cylinder is set upright at the funnel section outlet, with its top covered.

It is preferable that a pleated filter material is used for the rectifying cone above to provide a large filtering area for the suction air. However, the cross section does not have to be wave-shaped.

In the filter element of the first embodiment of the present invention, since the air sucked into the tapered cylindrical main element is subjected to rectification by the cone member with the head portion cut, suction air noise can be reduced and less turbulence occurs. In addition, since the cone member with the head portion cut functions as an air funnel and air is sucked into a sub-element made of filter material formed in such a way that it covers the opening of the cone member where the head portion has been cut, suction air amount is increased where there is no turbulence.

In the filter element of the first embodiment of the present invention, since there is provided, in addition to the cone member which functions as rectifier, an air funnel section which is formed at the inner side of the intake duct connection section formed at the larger diameter side opening, more effective rectification can be achieved. In addition, since turbulence is less likely to occur, significant loss in suction amount can be prevented.

In the filter element of the second embodiment of the present invention, since the inside of the smaller-diameter side opening of the main filter element is formed into an air funnel and a sub-filter element of a small diameter tapered cylinder is connected to the funnel section outlet in an erect or inverted posture, the air which passes through the main filter element is rectified by the outer face of the air funnel section or the sub-filter element. Therefore, there is less air suction noise. In addition, since there is less turbulence as a result of this rectification, reduction in the suction efficiency can be controlled.

In the aforementioned filter element of the second embodiment, since air is sucked into the main element and also into the sub-filter element, turbulence does not occur, which results in increased air suction amount.

In the filter elements of the first and second embodiments of the present invention, since the sub-filter element is completely provided within the main filter element, even if the main filter element is of the same size as a conventional product, a filter element having higher air suction capacity can be obtained.

DESCRIPTION OF THE PREFERRED EMBODIMENTS

Next, embodiments of the invention will be described with reference to the attached drawings.

Figure 1:
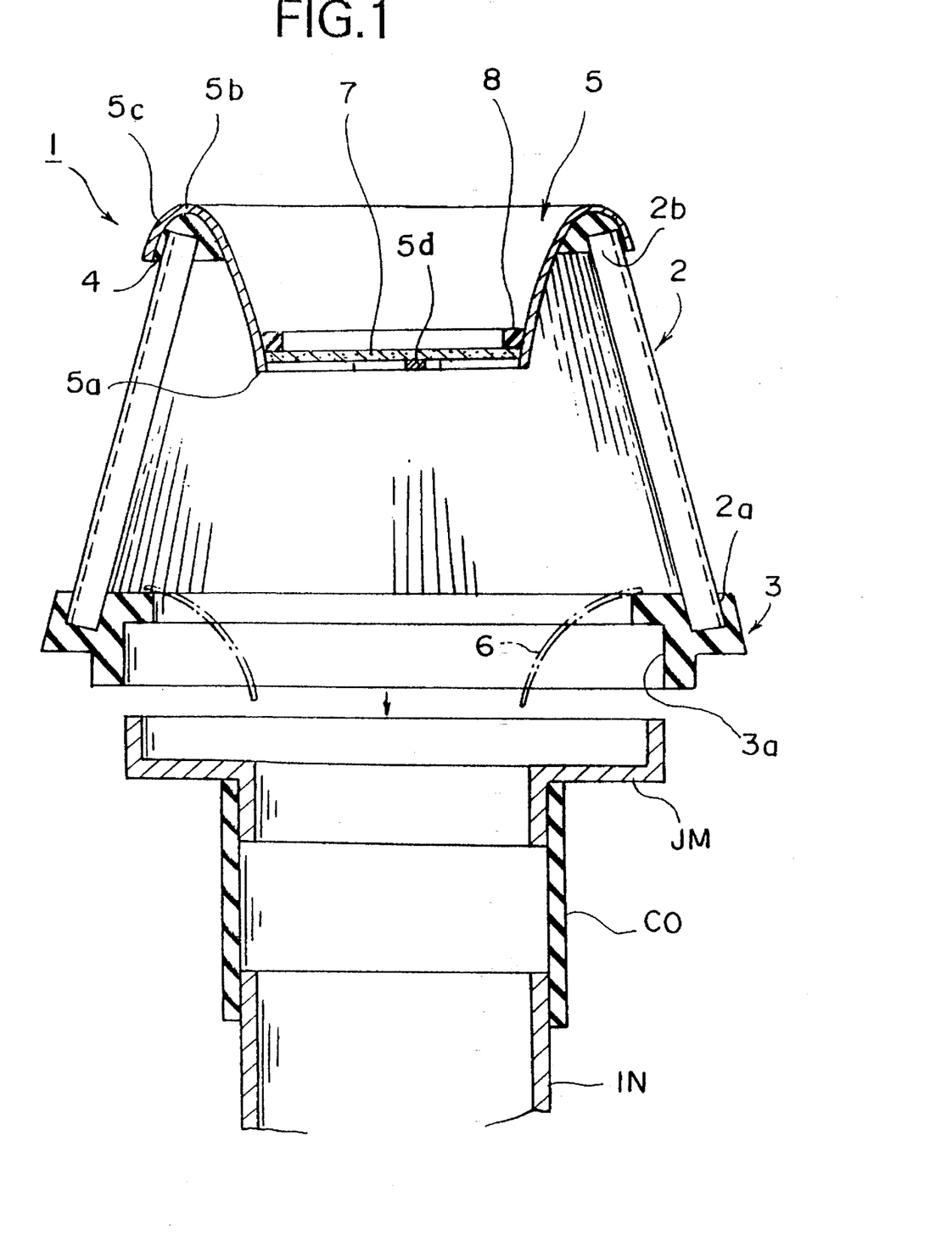
FIG. 1 is a vertical cross section of a modification of the filter element of the first embodiment of the present invention.

Referring to FIG. 1, reference numeral 1 denotes an air cleaner unit using a filter element of the first embodiment of the invention; reference numeral 2 denotes a main filter element (hereinafter referred to as "main element 2"); reference numeral 3 denotes a connection member formed at the larger diameter open end portion side of the main element 2; reference numeral 4 denotes an edge member formed at the smaller diameter open end portion side of the element 2; and reference numeral 5 denotes a cone member which is connected to the smaller diameter open portion side of the main element, with the head portion side cut.

Referring to the same figure, the main element 2 is formed into a tapered cylinder from a filter material such as cloth, paper, or unwoven cloth. Its cross section along the circumferential dimension is formed into the shape of a wave to provide a large filtration area. This main element 2 will be assumed to have both its inner and outer faces strengthened by a metallic mesh covering (not-illustrated). However, omitting the metallic mesh will virtually not alter the function of the filter element.

The connection member 3 of FIG. 1 is adhered to the larger diameter open end portion 2a of the main element 2 and integrally formed into the shape of a ring from such material as synthetic resin rubber such that the larger diameter open end side 2a is embedded therein. The inner peripheral side of the connection member 3 is formed into a layered holed air intake duct connection port 3a. The air intake duct connection port 3a is connected to the intake pipe IN making up the engine intake system by means of a joint fitting JM to which the connection port is fitted and secured, and, in this example, a rubber collar CO.

Ring-shaped edge member 4 made of synthetic rubber or the like is adhered by vulcanization to the upper end of the main element 2. Here, it is formed so that it functions as the supporting ring of the cone member 5 having the top portion cut (described later).

The aforementioned cone member 5 is adhered to and held by the edge member 4 at the smaller diameter side open end section 2b of the main element 2, as shown in FIG. 1, by forming its base side (or larger diameter side) 5b into a curved turn-down section 5c along the external shape of the edge member 4.

The opening 5a of the cone member 5, where the head portion has been cut, is covered by the same filter material used for the main element 2, which forms sub-filter element 7 (hereinafter referred to as "sub-element 7"), so that air is sucked in from this sub-element 7.

This cone member 5 with the head portion cut, has its inner peripheral face formed into a virtually funnel shape from a suitable material such as synthetic resin, rubber, paper, metal, unwoven cloth, or ceramic. The cross section may be made of porous material, when necessary.

Though not apparent from in the figure, the sub-element 7 is formed into a circular plate based on the diameter of the smaller diameter side opening 5a of the cone member 5, with the head portion cut, and is strengthened by metallic mesh coverings on both sides. In addition, this sub-element 7 is placed on grid section 5d by being inserted within the cone member 5, with the head portion cut. The sub-element 7 is clamped and secured by a synthetic rubber presser ring 8 from above and the aforementioned grid section 5d from below.

In the invention, an air funnel member 6, which is indicated by dashed lines in FIG. 1, may be provided at the inner side of the larger diameter side open end section 2a of the main element 2 in order to further increase or optimize the rectifying effect of the cone member 5, with the head portion cut. This air funnel member 6 allows better rectification effects and suction efficiency to be achieved.

In air cleaner unit 1 of FIG. 1 disposed in an automobile engine room which is constructed in the above-described way, as the engine starts the air surrounding the main element 2 passes therethrough. At the same time the air is sucked into the filter element 2, the air above the sub-element 7 passes therethrough, after which it is sucked into the element 2. The purified air obtained by filtration by the main element 2 and the sub-element 7, is sucked from the intake duct connection port 3a, through the joint fitting JM, and then the rubber collar CO, into the engine intake pipe IN.

The air is sucked in from the sub-element 7 by being rectified by the funnel-shaped inner peripheral face of the cone member 5, with the head portion cut. Therefore, turbulence in the main element 2 is less likely to occur, which obviously prevents reduction in the suction efficiency, with the result that the suction amount is increased.

In addition, in the filter element 2 of the first embodiment of the present invention, the cone member 5, with the head portion cut, which functions as an air funnel, air funnel member 6, and sub-element 7 are all completely disposed within the main element 2. Therefore, the external shape of the filter element 2 as a whole will not become large. For this reason, the air cleaner as a whole can be made compact, which is capable of achieving increased air suction, less turbulence, and good suction efficiency.

Next, the second filter element of the present invention will be described in detail with reference to FIGS. 2 through 4.

Figure 2:
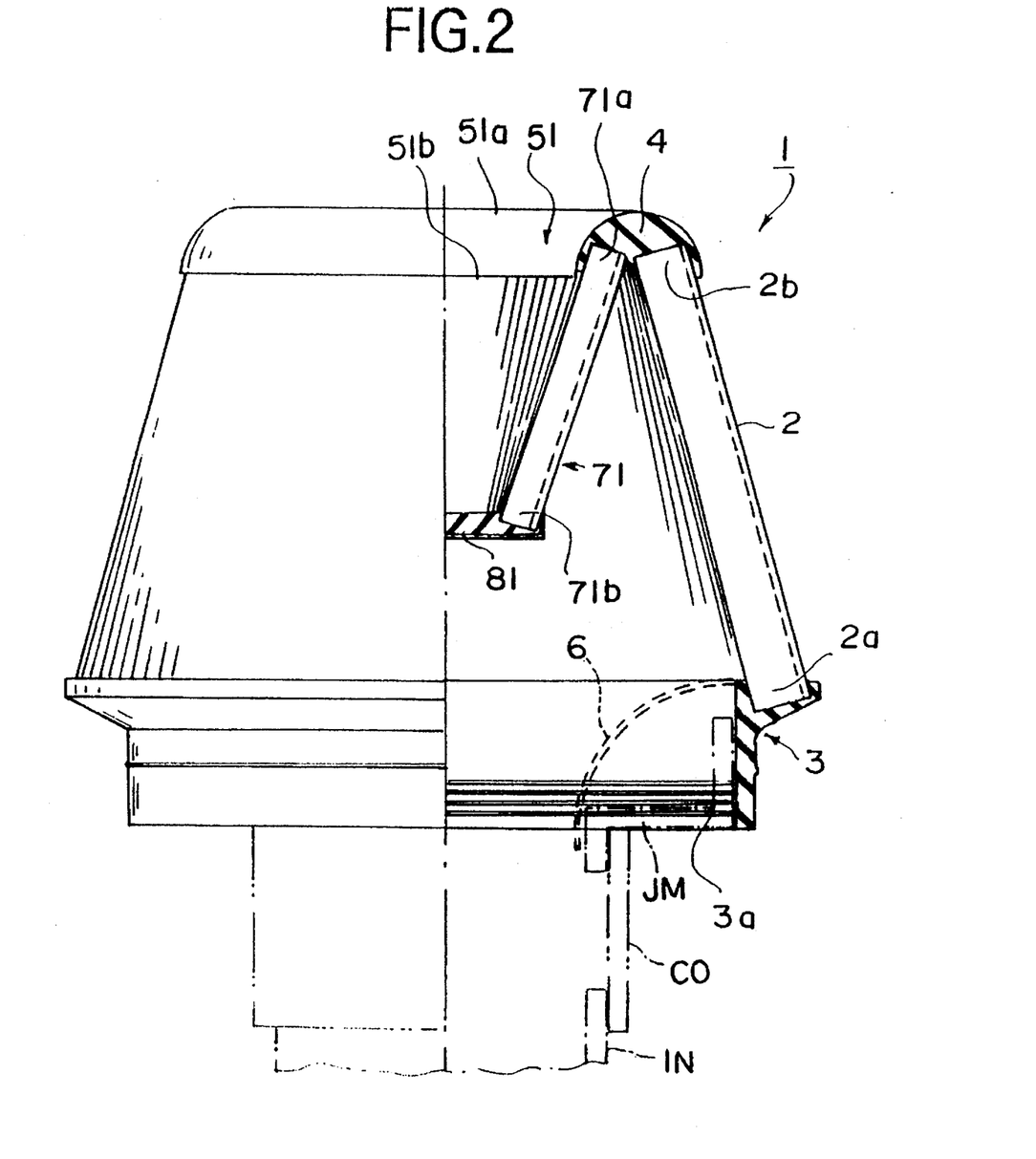
FIG. 2 is a vertical cross section of a modification of the filter element of the second embodiment of the present invention.
Figure 3:
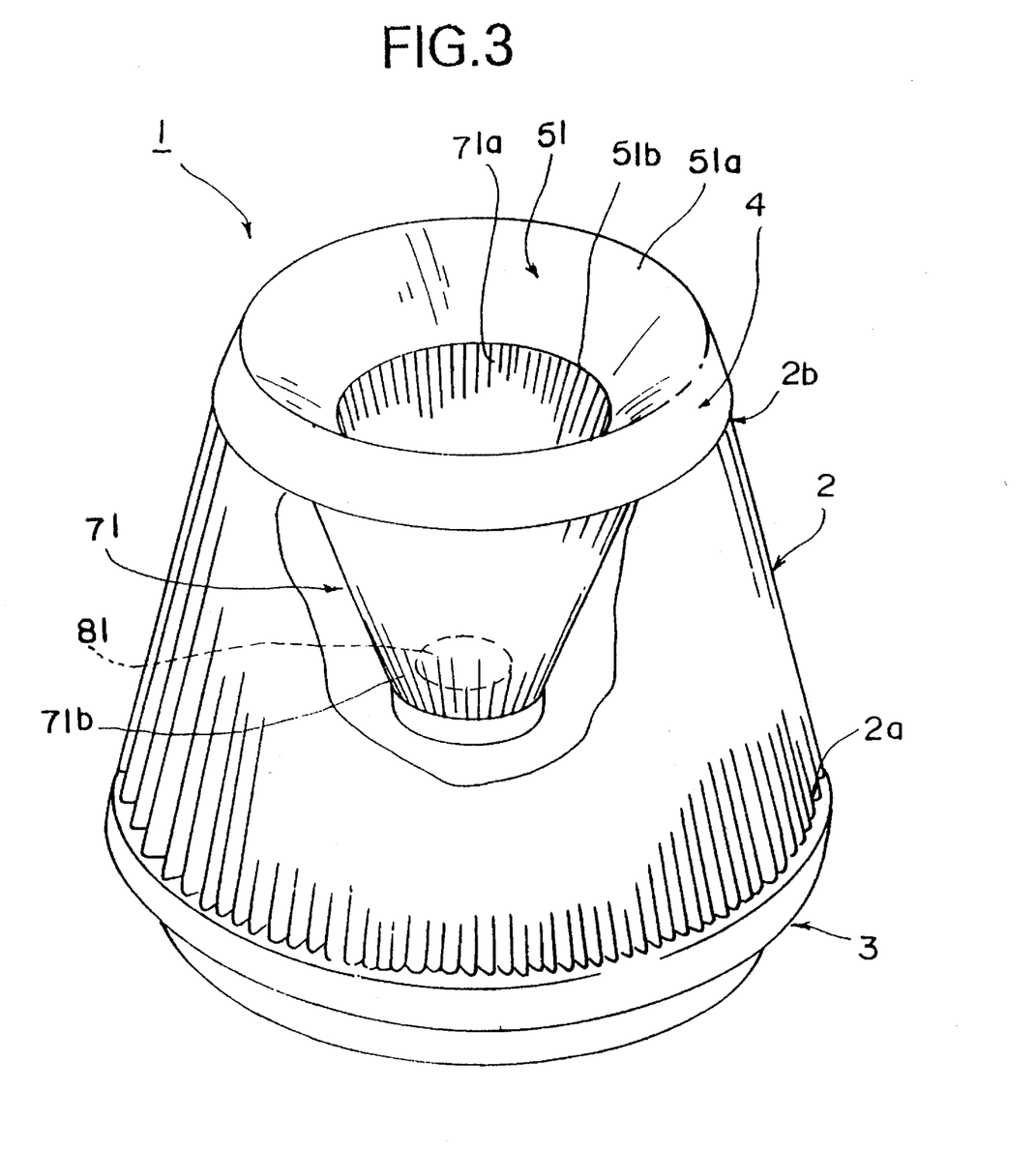
FIG. 3 is a perspective view of the filter element of FIG. 2.

Referring to FIGS. 2 and 3, reference numeral 1 denotes an air cleaner unit employing the filter element of the present invention; reference numeral 2 denotes a main filter element (hereinafter referred to as "main element 2"); reference numeral 3 denotes a connecting member, formed at the larger diameter side open end portion of the main element 2, for connection to the engine side intake duct; reference numeral 4 denotes an edge member formed at the smaller diameter open end portion of the main element 2; reference numeral 51 denotes an air funnel section obtained by shaping the outer surface of the edge member 4 into a funnel; and reference numeral 71 denotes a sub-filter element (hereinafter referred to as "sub-element 71") which is formed continuously with the air funnel section 51.

Referring to the same figure, the main element 2 is formed into a tapered cylinder from a filter material such as cloth, paper, or unwoven cloth. To form a large filter area, the cross section along the circumferential dimension is formed into the shape of a wave. Although, it will be assumed that the main element 2 is strengthened by metallic mesh coverings (not illustrated) on both the inner and outer faces, they do not have to be provided.

The connection member 3 of FIG. 2 is a ring-shaped component part made of synthetic rubber or the like and is integrally adhered by vulcanization to the larger diameter side open end section 2a of the main element 2, such that the open end section is embedded therein. An intake duct connecting port 3a with grooves is formed at the inner peripheral side of the member. The intake duct connection port 3a is connected to an intake pipe IN (which forms the engine intake system) by means of a joint fitting JM secured and fixed thereto and, in this example, a rubber collar CO which is connected to the joint fitting JM.

The ring-shaped edge member 4 made of such material as synthetic rubber is adhered to the top of the main element 2 by vulcanization. The outer surface thereof is shaped into a funnel to form an air funnel section 51.

In the embodiment of FIG. 2, the aforementioned air funnel section 51 has its inlet side 51a formed continuously with the outer face of the edge member 4. In addition, a small sub-element 71 has its larger diameter side opening 61a integrally connected by vulcanization internally to the outlet side of the air-funnel section. The sub-element 71 is obtained, as the main element 2, by forming filter material into a cylinder with a wave-shaped cross section, which widens.

Integrally connecting the sub-element 71 to the outlet side 51b of the air funnel section 51, which is integral with the edge member 4, by embedding the larger diameter side opening 71a of the sub-element, causes the smaller diameter side opening 71b of the element 71 to project internally of the main element 2. In addition, a cover member 81 made of such material as synthetic rubber covers the smaller diameter side opening 71b of the sub-element 71. It is adhered thereto by vulcanization.

In a filter element of the second embodiment of the present invention, it is preferable to provide an air funnel member 6, indicated by dashed lines in FIG. 1, at the inner side of the larger diameter side open end section 2a of the main element in order to rectify the air to be sucked into the main element 2. This air funnel member 6 allows better rectification and suction efficiency to be achieved.

Accordingly, a modification of a filter element of the second embodiment of the present invention is constructed as follows. Air is sucked into the filter element 2 from its entire outer surface. At the same time, it is rectified by the funnel section 51 which is formed at the smaller diameter side opening of the main element 2. Air is also sucked in from the sub-element 71 which is formed continuously with the funnel section 51. The air then flows into the intake pipe IN side. The air to be sucked in from the main element 2 is rectified by a virtually cone-shaped outer face formed by the outside surface of the sub-element 71. Since rectified air is sucked in from the sub-element 71, less turbulence occurs, which results in less air suction noise. In addition, highly efficient air suction is possible where there is no turbulence.

The air, which has been purified by filtration by the main element 2 and the sub-element 71, flows from the intake duct connection port 3a to the joint fitting JM, through the rubber color collar, into the engine intake pipe IN.

In air cleaner unit 1 of the second embodiment of the present invention, the sub-element 71, which is continuously formed with the air funnel section 51, is arranged completely within the main element 2. Therefore, the external shape of the air cleaner unit 1 as a whole will not become large. For this reason, the air cleaner as a whole can be made compact, which is capable of achieving increased air suction, less turbulence, and good suction efficiency.

Figure 4:
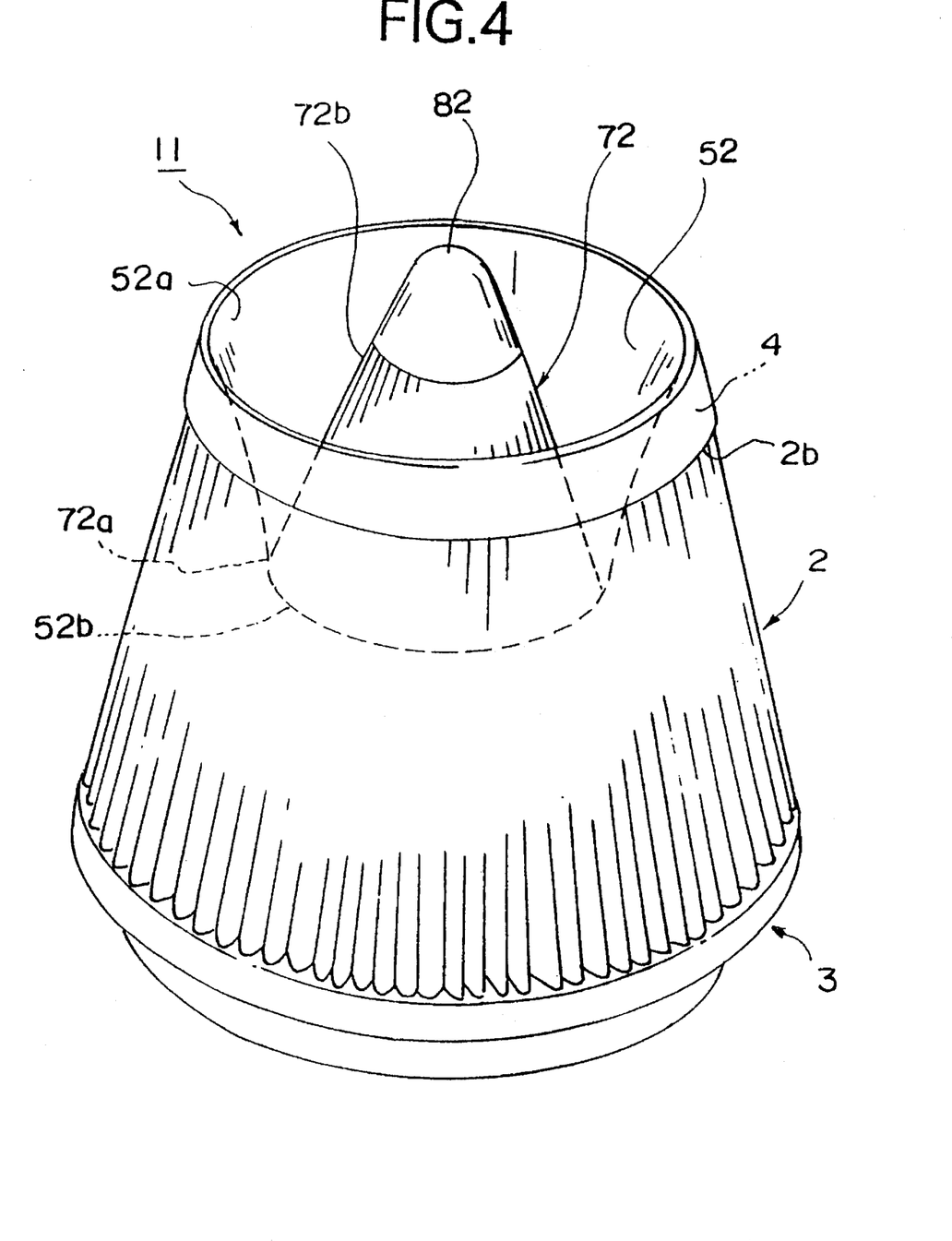
FIG. 4 is a vertical cross section of another modification of the filter element of the second embodiment of the present invention.

FIG. 4 illustrates another modification of the second air cleaner unit of the present invention. This filter element 11 also has a connection member 3 as air cleaner unit 1 of the second embodiment of the invention.

Cone member 52, made of such material as rubber, paper, cloth, unwoven cloth, or ceramic has its inner and outer peripheral faces formed into the shape of a funnel, and has the head portion cut. Its larger diameter side end section 52a is adhered to the edge member 4 by vulcanization, and the smaller diameter side open end section 2b of the main element to be embedded in the edge member 4. Accordingly, the inner face of the cone member 52 is formed so that it functions as an air funnel section, while the outer face is formed to function as a rectifying cone. As the aforementioned sub-element 72, the small sub-element 71 is formed into a tapered cylinder from filter material. It has a wave-shaped cross section, and is strengthened by a metallic mesh covering on both sides. This small sub-element 72 is integrally adhered by vulcanization to the smaller diameter side opening 52b of the cone member 52, with the head portion cut, with the sub-element 72 in an erected posture.

The aforementioned sub-element 72 has its larger diameter side opening 72a integrally connected to the opening 52b of the smaller diameter side end section of the cone member 52 with the head portion cut. This causes the smaller diameter side opening 72b of the element 72 to be located at the inlet of the cone member 52 with the head portion cut. A projectile-shaped cap member 82 is adhered to the smaller diameter side opening 72b by vulcanization for covering the opening.

In air cleaner unit 11 of the second embodiment of the invention, as the aforementioned filter element example, upon the start of the engine, ambient air flows into the main element 2. At the same time, air above the sub-element 72, which is subjected to rectification by the funnel-shaped cone member 52 with the head portion cut, passes through the sub-element 72 and flows into the main element 2. The air, which has been purified by the main element 2 and the sub-element 72, is, as in the previous embodiment, sucked from the connecting port 3, to the joint fitting JM (not illustrated), through the rubber collar CO (also not illustrated), into the engine intake pipe IN.

The air to be sucked in from the main element 2 is subjected to rectification by the outer face of the cone member 52 with the head portion cut. In addition, the air to be sucked in from the sub-element 72 is rectified as it passes along the inner peripheral face of the cone member 52 (with the head portion cut) which functions as an air funnel and the outer peripheral face of the projectile-shaped cap member 82. Therefore, the sucked air is less likely to be turbulated, and reduced suction efficiency of the filter element almost never occurs. The air cleaner unit 11 also has the cone member 52 with the head portion cut, sub-element 72, and cap member 82 all completely within the main element 2, which is formed into an overall compact structure. Therefore, more space does not have to be provided in the engine room, with the result that it can have a wider use of application.

Accordingly, in the filter element of the first embodiment of the invention, a cone member (with the head portion cut) which functions to rectify air is provided inside the tapered cylindrical-shaped main filter element. This prevents turbulence of sucked air from occurring, which results in reduced air suction noise. In addition, reduction in suction efficiency caused by turbulance can be controlled.

In the filter element of the second embodiment of the invention, a section which functions as an air funnel is formed at the smaller diameter side opening of the tapered cylindrical main filter element, with a sub-filter element continuously formed with the funnel section outlet. Therefore, turbulence of sucked air occurs less frequently, which results in reduced air suction noise. In addition, reduction in suction efficiency caused by turbulance does not occur.

In the filter element of the invention, a sub-element is provided within the main filter element. This allows air to be sucked in by the main element as well as the sub-element at the same time. Consequently, more air can be sucked in because the suction resistance is not increased.

In addition, the aforementioned sub-element is completely disposed within the main element, so that the external shape does not have to be changed even for increased air suction. Therefore, when the suction amount is the same as that of a conventional filter element, the external shape is more compactly formed, which increases its application as replacement parts to other vehicle types.

What is claimed is:

1. A filter element of an air cleaner unit comprising:

a tapered cylinder of a pleated filter material and whose larger diameter side opening is connected to an engine intake duct;

a cone member provided vertically within a smaller diameter side opening of said cylinder, with a base section of said cone member covering said smaller diameter side opening of said cylinder, and wherein a head portion of said cone member has an opening which is covered with filter material, with an inner peripheral wall of said cone member forming a funnel facilitate air flow into said opening covered with said filter material.

2. A filter element of an air cleaner unit according to claim 1, wherein the inner side of the larger diameter side opening of the tapered cylinder is an air funnel.

3. A filter element of an air cleaner unit comprising:

a tapered cylinder of a pleated filter material and whose larger diameter side opening is connected to an engine intake duct;

a funnel-shaped sub-filter element in a smaller diameter side opening of said cylinder, said sub-filter element having its larger base connected to said smaller diameter side opening of said cylinder and its smaller base covered.

4. A filter element of an air cleaner unit comprising:

a tapered cylinder of a pleated filter material and whose larger diameter side opening is connected to an engine intake duct;

a funnel-shaped portion at a smaller diameter side opening of said cylinder; and a tapered cylindrical sub-filter element within said funnel-shaped portion, said sub-filter element having its larger base connected to a smaller diameter side opening of said funnel-shaped portion and its smaller base covered.

5. A filter element of an air cleaner unit according to claim 3 or 4, wherein an air funnel is formed within the larger side open end section of the tapered cylinder.

6. An air cleaner unit for filtering air flowing into an air intake opening comprising:

a first filter having a tapered cylindrical shape with a larger opening end for attachment to the air intake opening and a smaller opening end opposite said larger opening end, said first filter having a circumferential tapered wall of pleated air filtering material for receiving air which is flowing into the air intake opening;

a second filter having a tapered cylindrical shape with a larger opening end attached to said smaller opening end of said first filter and a smaller opening end which is inside said first filter, said second filter comprising a circumferential tapered wall of air-impervious material, and a covering of air filtering material for closing said smaller opening end of said second filter and for receiving air which is flowing into the air intake opening through said larger opening end of said first filter, said covering being adhered to a circumferential edge of said smaller opening end of said second filter;

an edge member of a rubber material which is adhered to a circumferential edge of said smaller opening end of said first filter and to a circumferential edge of said larger opening end of said second filter for attachment of said first and second filters; and a connection member of a rubber material which is adhered to a circumferential edge of said larger opening of said first filter, said connection member having means for attachment to the air intake opening.

7. The air cleaner unit of claim 6 further comprising an air funnel attached and interior to said connection member for facilitating air flow from said first filter into the air intake opening, said air funnel having a tapered cylindrical shape with arcuate walls and a larger opening end interior to said first filter and a smaller opening end for insertion into the air intake opening.

8. The air cleaner unit of claim 6 wherein said circumferential tapered wall of said second filter has an aerodynamic shape for facilitating air flow through said larger opening end of said first filter and through said air filtering material of said first filter.

9. The air cleaner unit of claim 6 wherein said covering comprises a third filter having a tapered cylindrical shape with a larger opening end attached to said smaller opening end of said second filter and a smaller opening end which is exposed at said smaller opening end of said first filter, said third filter comprising pleated air filtering material which is adhered to a circumferential edge of said smaller opening end of said second filter.

10. The air cleaner unit of claim 9 further comprising a further edge member of a rubber material which is adhered to a circumferential edge of said smaller opening end of said second filter and to a circumferential edge of said larger opening end of said third filter for attachment of said second and third filters.

11. The air cleaner unit of claim 9 further comprising an aerodynamic cap member of a rubber material which is adhered to a circumferential edge of said smaller opening end of said third filter for smoothing air flow into said smaller opening end of said first filter.

12. An air cleaner unit for filtering air flowing into an air intake opening comprising:

- a first filter having a tapered cylindrical shape with a larger opening end having means for attachment to the air intake opening and a smaller opening end opposite said larger opening end, said first filter having a circumferential tapered wall of air pleated filtering material for receiving air flowing into the air intake opening;
- a second filter having a tapered cylindrical shape with a larger opening end attached to said smaller opening end of said first filter and a smaller opening end which is inside said first filter, said second filter having a circumferential tapered wall of pleated air filtering material;
- a covering of a rubber material for closing said smaller opening end of said second filter, said covering being adhered to a circumferential edge of said smaller opening end of said second filter;
- an edge member of a rubber material which is adhered to a circumferential edge of said smaller opening end of said first filter and to a circumferential edge of said larger opening end of said second filter for attachment of said first and second filters; and
- a connection member of a rubber material which is adhered to a circumferential edge of said larger opening of said first filter, said connection member having means for attachment to the air intake opening.

13. The air gleaner unit of claim 12 further comprising an air funnel attached and interior to said connection member for facilitating air flow from said first filter into the air intake opening, said air funnel having a tapered cylindrical shape with arcuate walls and a larger opening end interior to said first filter and a smaller opening end for insertion into the air intake opening.

* * * * *